Dec. 13, 1927.
J. B. STRAUSS
1,652,186
YIELDING BARRIER FOR VEHICLES
Filed Aug. 12, 1922  3 Sheets-Sheet 3
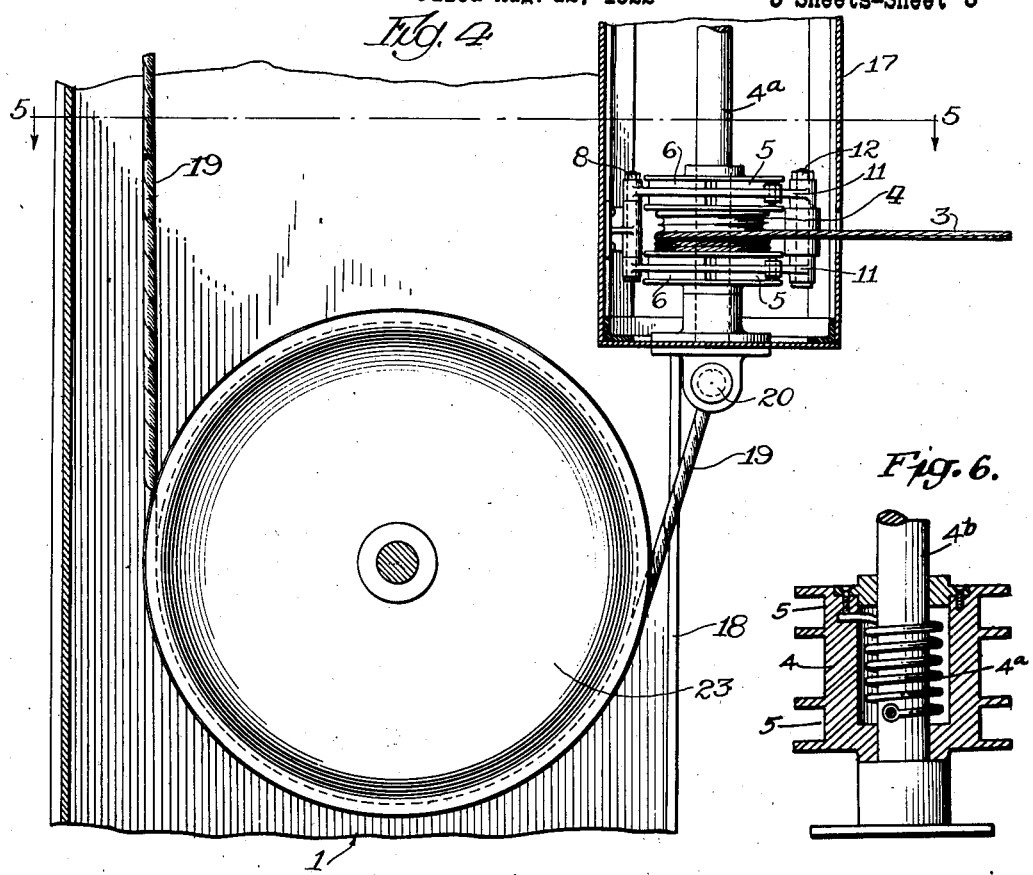
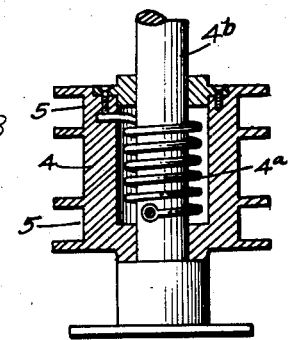
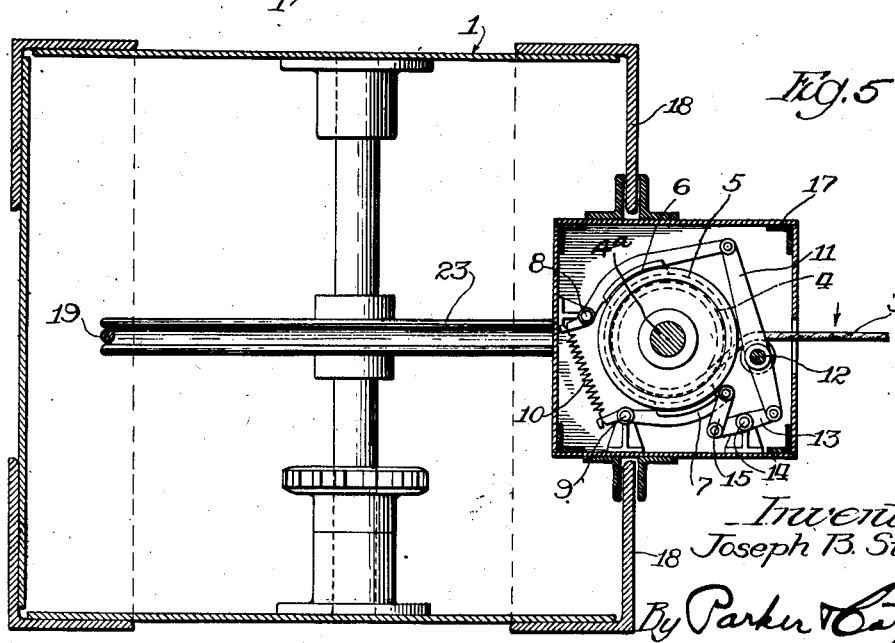
Inventor
Joseph B. Strauss.
By Parker & Carter
Attys.

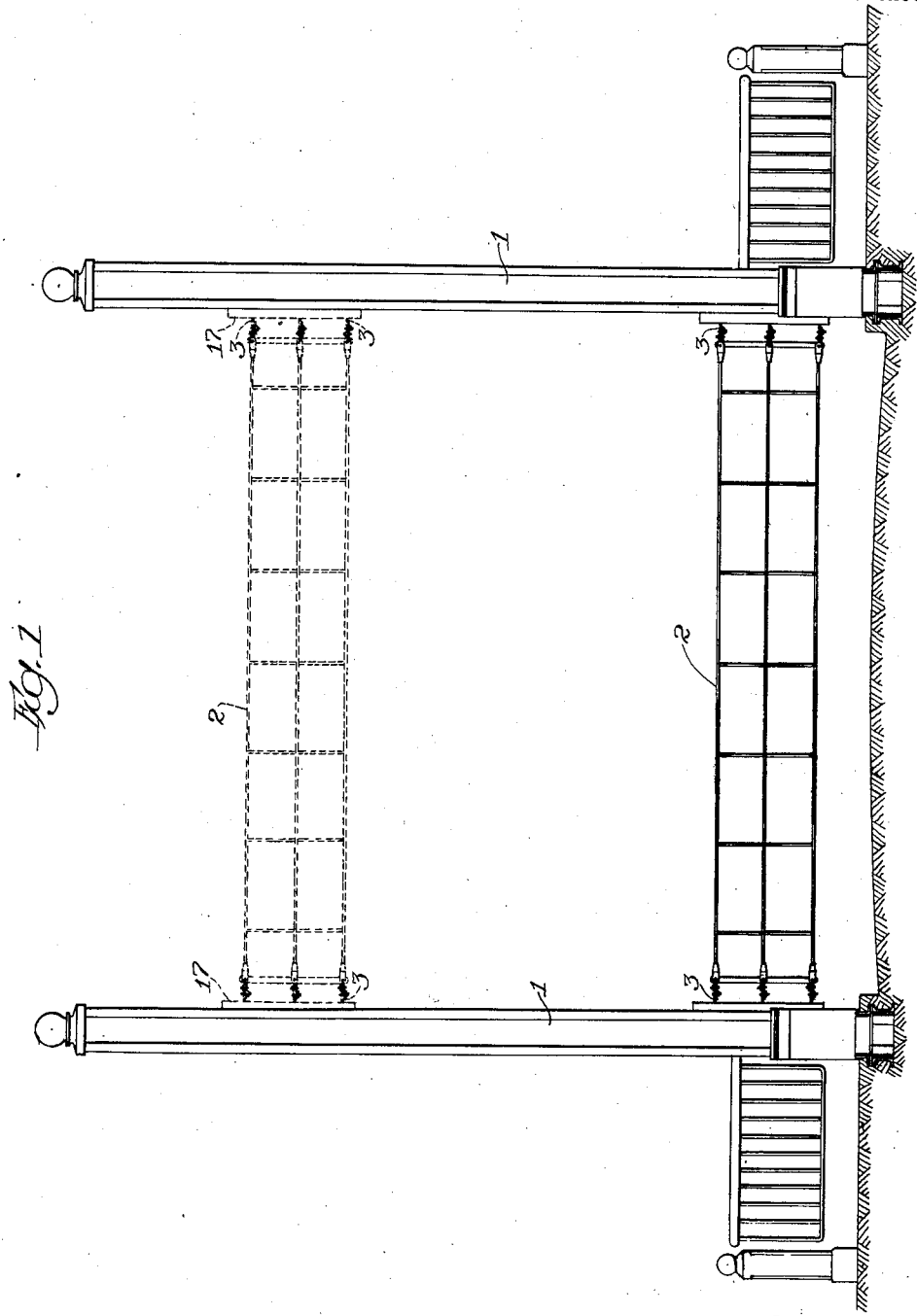

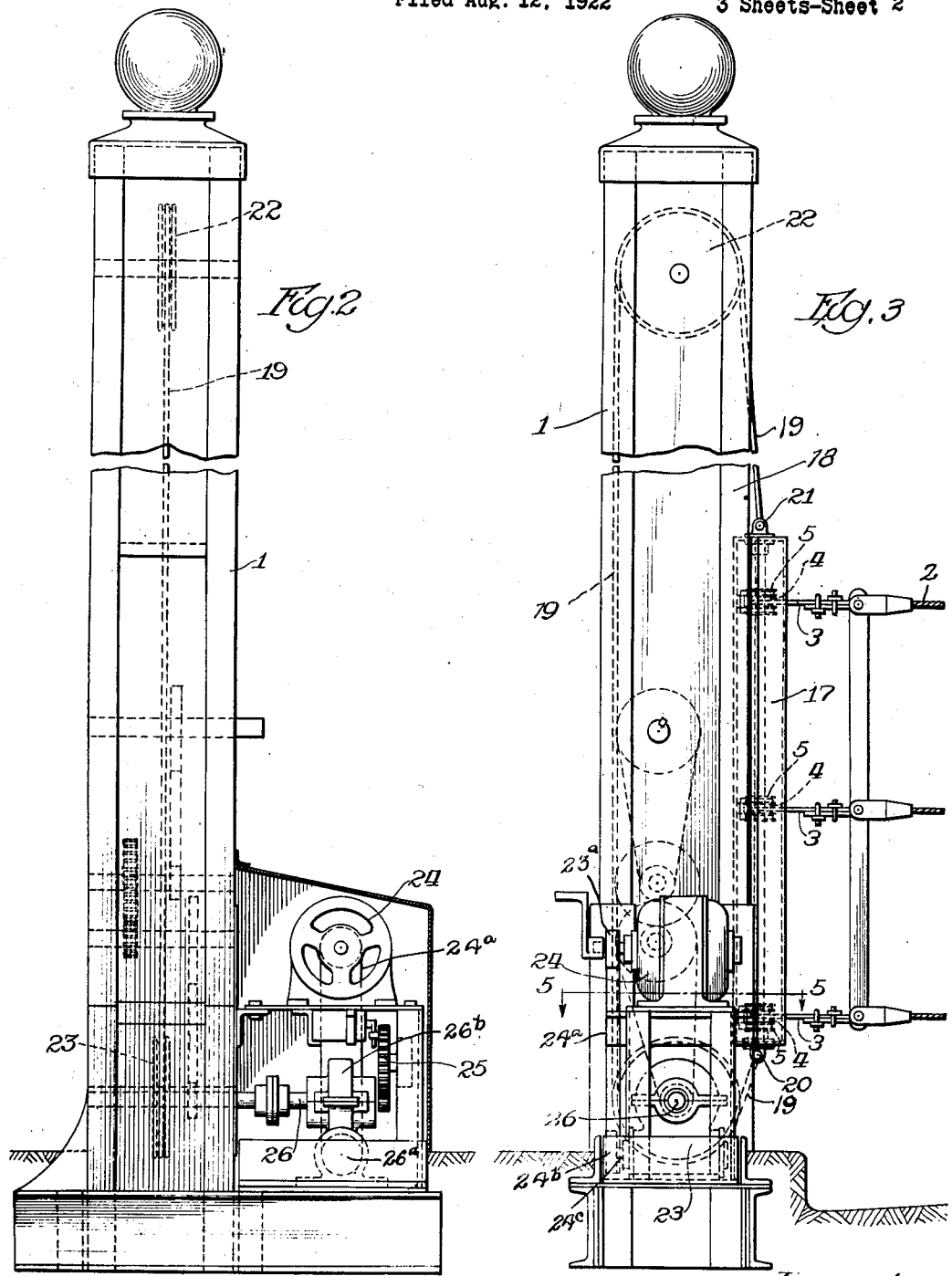

Patented Dec. 13, 1927.

1,652,186

UNITED STATES PATENT OFFICE.

JOSEPH B. STRAUSS, OF CHICAGO, ILLINOIS.

YIELDING BARRIER FOR VEHICLES.

Application filed August 12, 1922. Serial No. 581,339.

This invention relates to yielding barriers for vehicles, and has for its object to provide a new and improved barrier of this description whereby a moving vehicle may be gradually stopped without injuring the vehicle or the occupants.

Referring now to the accompanying drawings.

Fig. 1 is a front view showing one form of device embodying the invention;

Fig. 2 is an enlarged side view of one of the supports;

Fig. 3 is a front view of the device shown in Fig. 2;

Fig. 4 is an enlarged detail showing the end of the lifting cable;

Fig. 5 is a sectional view taken on line 5—5 of Fig. 1;

Fig. 6 is a longitudinal sectional view through one of the drums with the brakes and cable omitted.

Like numerals refer to like parts throughout the several figures.

In carrying out my invention I provide posts or supports 1 on opposite sides of the roadway. I also provide a flexible obstructing device 2 which extends between these posts and which can be raised so as to be out of the way and lowered so as to extend across the roadway and be engaged by any vehicle attempting to pass. The obstructing device 2 has connected to it at each end flexible devices or cables 3. These cables are wound around drums 4 (see Figs. 3, 4 and 5). When the obstructing device is struck by a vehicle, the pressure on it unwinds the cables 3 from the drums and permits the obstructing device to move forward with the vehicle. Some means is provided for resisting this forward movement so as to bring the vehicle to a stop.

In the construction illustrated the drums are provided with suitable retarding devices or brakes which resist their rotation, and these brakes are automatically applied by the pressure of the vehicle on the obstructing device. One form of the brake is illustrated in Figs. 4 and 5. In this construction the drums 4 are provided preferably at both ends with the brake drums 5. Engaging these brake drums are the braking elements 6 and 7, pivoted at 8 and 9, and provided with the retracting spring 10.

Means is provided for clamping these brake elements on the brake drum when the obstruction device is struck by the vehicle. One mechanism for this purpose is illustrated, wherein the brake element 6 has connected therewith a pivoted member 11 which has a guide 12 over which the cable 3 passes. The member 11 is pivoted to the lever 13, the lever being pivoted at 14 between its ends and being also connected with a link 15 which is pivoted to the brake member 7. All of the drums are preferably provided with this arrangement.

It will be seen that when the obstructing device is struck by the vehicle and the cables 3 begin to pay out, there will be a pressure applied to the guide 12, and hence to the pivoted member 11, tending to pull it toward the lever 13. This clamps the brake member 6. The pressure of the pivoted member 11 on the lever 13 rocks it about its pivot 14, and by means of the links 15 clamps the brake member 7 on the brake drum. It will thus be seen that this braking action is automatic and that the greater the pressure, the greater the braking action will be. It will further be seen that this construction permits the obstructing device to gradually move under the impact of the vehicle, and that it will be gradually stopped so as to stop the vehicle without injuring it or the passengers.

Some suitable means is provided for retracting the drums 4 when the pressure from the obstructing device is relieved. This retracting device may consist of a retracting spring $4^a$ as shown in Fig. 6. One end of the spring is connected with the drum 4 and the other end with a non-rotating part such as the part $4^b$ upon which the drum is mounted. The drums 4 and the braking apparatus on each post are carried by a sliding part 17 which slides along the sides 18 of the post, as clearly illustrated in Fig. 5. This sliding part is operated by some suitable mechanism so that the obstructing device can be lifted out of the way and lowered across the roadway when desired.

In the construction shown this lifting mechanism comprises a cable 19 which has its ends connected to the sliding device, as shown at 20 and 21 (see Fig. 3). This cable passes over the pulleys 22 and 23.

A suitable motor 24 is provided, the motor being connected by a belt $24^a$ on pulley $23^a$ of the motor shaft, which belt engages a pulley $24^b$ on the shaft $24^c$. This shaft is connected with the shaft 26 by a worm $26^a$ which engages a worm gear $26^b$ on said shaft. The gear 25 which is operated from the shaft 26 controls a limiting switch (see Fig. 2). It will thus be seen that when the motor is rotated in one direction, the sliding devices, drums and brakes will be moved up so as to move the obstructing device out of the way, as shown in dotted lines in Fig. 1 and that when the motor is rotated in the other direction the sliding devices, drums and brakes will be moved downwardly so as to move the obstructing device across the roadway.

I have described in detail a particular construction embodying my invention, but it is, of course, evident that the parts may be varied in many particulars without departing from the spirit of the invention as embodied in the claims hereto appended, and I therefore do not limit myself to the particular construction shown.

I claim:

1. A yielding barrier for stopping vehicles comprising posts on opposite sides of the space to be protected, a flexible obstructing device extending across the space between the posts, cables connected with said obstructing device, drums upon which said cables are wound, said cables unwinding when the obstructing device is struck by the vehicle, a friction device for frictionally retarding the rotation of said drums, a lever movably connected with the flexible obstructing device and actuated by the pull of said flexible obstructing device when it is struck by a vehicle, and a connection between said lever and the friction device whereby the friction device is brought into operation by the pull of the flexible obstructing device.

2. A yielding barrier for stopping vehicles comprising posts on opposite sides of the space to be protected, a flexible obstructing device extending across the space between the posts, cables connected with said obstructing device, drums upon which said cables are wound, said cable unwinding when the obstructing device is struck by the vehicle, brakes associated with said drums to resist the unwinding thereof so as to gradually bring the vehicle to a stop, means associated with the drums to rewind the cables when the pressure on the obstructing device is removed, and means for raising and lowering the obstructing device and the drums and brakes when it is desired to move the obstructing device into or out of its operative position.

3. A yielding barrier for vehicles comprising posts on opposite sides of the space to be protected, a sliding part slidably connected with each post so that it may move up and down therealong, drums mounted on said sliding parts, cables on said drums, an obstructing device between the posts and to which said cables are connected, the cables unwinding when the obstructing device is struck by a moving vehicle, brakes associated with said drums for resisting the unwinding of the cables to gradually bring the vehicles to a stop, means for automatically rewinding the cables when the pressure of the vehicle is removed from the obstructing device, and means for sliding said sliding pieces upwardly along said posts when it is desired to move the obstructing device to an inoperative position.

4. A yielding barrier for vehicles comprising posts on opposite sides of the space to be protected, said posts having longitudinal slots therein, a sliding part associated with each post and adapted to slide in said slots, rotatable drums carried by said sliding part, cables on said drums, an obstructing device between the posts connected with said cables, the cables unwinding when the obstructing device is struck by a moving vehicle, and means for lifting and lowering said sliding part and drums so as to move them up out of the way when it is desired to have a free passageway.

5. A yielding barrier for vehicles comprising posts on opposite sides of the space to be protected, said posts having longitudinal slots therein, a sliding part associated with each post and adapted to slide in said slots, rotatable drums carried by said sliding part, cables on said drums, an obstructing device between the posts connected with said cables, the cables unwinding when the obstructing device is struck by a moving vehicle, resisting devices carried by said sliding parts for resisting the unwinding of said cables, and means for lifting and lowering said sliding part and drums so as to move them up out of the way when it is desired to have a free passageway.

6. A yielding barrier for stopping vehicles comprising posts on opposite sides of the space to be protected, a flexible obstructing device extending across the space between the posts, drums movably mounted upon said posts, cables wound about said drums and connected with said flexible obstructing device, brakes associated with said drums adapted to retard the rotation thereof, said brakes directly actuated by said cables when the flexible obstructing device is struck by the vehicle.

7. A yielding barrier for stopping vehicles comprising posts on opposite sides of the space to be protected, a flexible obstructing device extending across the space between the posts, cables connected with said obstructing device, drums movably connected with said posts and rotating about an axis extending longitudinally to the posts, said cables being wound around said drums, brake members adapted to retard the rotation of said drums, members connected with each of said brake members engaged by said cables, so as to tighten the brake members when the obstructing device is struck by a vehicle.

Signed at Chicago, county of Cook and State of Illinois, this 24 day of July, 1922.

JOSEPH B. STRAUSS.